(12) United States Patent
Otten, III

(10) Patent No.: US 7,167,249 B1
(45) Date of Patent: Jan. 23, 2007

(54) HIGH EFFICIENCY SPECTRAL IMAGER

(75) Inventor: Leonard John Otten, III, Placitas, NM (US)

(73) Assignee: Kestrel Corporation, Albuquerque, NM (US)

( * ) Notice: Subject to any disclaimer, the term of this patent is extended or adjusted under 35 U.S.C. 154(b) by 264 days.

(21) Appl. No.: 10/723,901

(22) Filed: Nov. 25, 2003

(51) Int. Cl.
  *G01B 9/02* (2006.01)
  *G01J 3/45* (2006.01)

(52) U.S. Cl. .................. 356/456; 356/520

(58) Field of Classification Search ........... 356/451, 356/453, 456, 328, 520; 250/339.07, 339.08
See application file for complete search history.

(56) References Cited

U.S. PATENT DOCUMENTS

| | | | |
|---|---|---|---|
| 4,181,440 A * | 1/1980 | Frosch et al. | 356/451 |
| 6,687,007 B1 * | 2/2004 | Meigs | 356/456 |
| 2004/0085542 A1 * | 5/2004 | Soliz et al. | 356/456 |

FOREIGN PATENT DOCUMENTS

GB 2 317 446 A * 3/1998

* cited by examiner

Primary Examiner—Gregory J. Toatley, Jr.
Assistant Examiner—Patrick Connolly
(74) Attorney, Agent, or Firm—DeWitt M. Morgan; Rodey Dickason Sloan Akin & Robb PA

(57) ABSTRACT

Optical instruments having, inter alia, optics to process wavelengths of electromagnetic radiation to produce an interferogram. The instruments include at least one optical path and optical elements positioned along this path for splitting and recombining the wavelengths which interfere with each other to produce a plurality of different fringes of different wavelengths. In one group, the optics include matched gratings which are positioned along the optical path outside of the interferometer optics to produce first and second sets of spectrally dispersed beams. The interferometer optics also includes a beam splitter and first and second mirrors. The gratings may be positioned in a variety of locations along the optical path. In another group, the optics include a beam splitter having a plurality of surfaces, wherein each of the surfaces is either 100% reflective, 100% transmissive or 50% reflective and 50% transmissive. In a third group, the optics includes the beam splitter having a plurality of reflective and transmissive surfaces and matched gratings. The instruments can all include a detector for detecting the interferogram and means for processing the detected interferogram to produce spectral information.

15 Claims, 7 Drawing Sheets

HIGH EFFICIENCY SPECTRAL IMAGER

GOVERNMENTAL RIGHTS CLAUSE

This invention is made with U.S. Government support under F 29601-96-C-0096 and F29601-98-0204 awarded by the U.S. Air Force, and N00178-02-3096 awarded by the U.S. Navy. The U.S. Government has certain rights in the invention.

FIELD OF THE INVENTION

The present invention relates to optical instruments which process wavelengths of electromagnetic radiation to produce an interferogram. More particularly, the present invention relates to instruments (e.g., Fourier transform spectrometers) that produce interferograms of a scene, which instruments include an optical system which both splits the incoming wavelengths and spectrally disperses them to produce two sets of spectrally dispersed beams. The dispersion is achieved by a matched pair of gratings positioned outside the interferometer optics. U.S. Pat. No. 6,687,007 B1 discloses embodiments wherein the matched pair of gratings is positioned inside the interferometer optics.

The present invention also relates to a new beam splitter which eliminates the 50% light loss inherent in the Sagnac (or common path) interferometer.

These instruments are useful in analyzing individual chemical species in absorption, emission, or reflected spectroscopy where there is a need to image a time and spatially varying scene. This could be, for example, imaging an emission plume for a jet or rocket engine or a smoke-stack, environmental observations, non invasive blood monitoring, and other medical observations.

BACKGROUND OF THE INVENTION

Imaging spectrometers are, broadly speaking, optical instruments which process the electromagnetic radiation from a source into its fundamental components. For instance, an interferometric based spectrometer divides light from a source and interferes it to produce a fringe pattern of interfering light (i.e., an interferogram). The interference pattern can be captured on film or by, for instance, an electronic detector, for example, a semi-conductor array detector (e.g., a charged coupled device (CCD)).

There are numerous optical interferometer designs. The basic form of the Sagnac (or common path) interferometer is illustrated in FIG. 1. It is also illustrated in U.S. Pat. No. 4,976,542 to Smith. Other designs include the Mach-Zender interferometer, the Michelson interferometer and Twyman-Green interferometer (See W. L. Wolfe, Introduction to Imaging Spectrometers, SPIE Optical Engineering Press, pp. 60–64, 1997), the Fabry-Perot interferometer (see Wolfe, p. 70–73), the Lloyd's mirror interferometer (see the Smith patent) and, a variation of the common path interferometer (Sagnac) sometimes referred to as the Barnes interferometer (see T. S. Turner Jr., et al., A Ruggedized Portable Fourier Transform Spectrometer for Hyperspectral Imaging Applications, SPIE Vol. 2585 pp 222–232.) There are also dispersive spectrometers such as prism spectrometers and grating spectrometers. (See Wolfe, pp. 50–52 and 55–57).

In a non-imaging Fourier transform spectrometer the point source of radiation is split into two virtual points a fixed distance apart to yield a fringe pattern at the detector. If one wants to attain a fine spectral resolution, the distance between the two virtual points should be large; for a course spectral resolution, it should be short. This distance may be controlled by shifting one of the mirrors (typically referred to as lateral shear) of, for instance, the common path interferometer. With this arrangement, a wide spectral range measurement loses resolution, while a high resolution measurement reduces the effective spectral range. In an imaging spectrometer, the point source is imaged with a set of imaging optics and a slit is inserted giving the instrument the capability of one-dimensional imaging in the direction perpendicular to the shear.

Shear, both lateral and angular, is discussed in Turner, Jr. et al. (supra). For the Sagnac, translation of either mirror in the plane of FIG. 1 produces lateral shear. Mirror tilt about an axis perpendicular to the drawing plane also produces lateral shear. Conversely, in the Barnes interferometer only angular shear is possible and is produced only by mirror tilt. See FIGS. 2 and 3 of Turner, Jr., et al.

U.S. Pat. No. 4,976,542 to W. H. Smith discloses a Fourier transform spectrometer which incorporates the common path (or Sagnac) interferometer and in which a charge-coupled device (CCD) is placed in the image plane instead of film. The CCD has pixels aligned along two dimensions to provide both spectral resolution and spatial resolution. The CCD is characterized by greater dynamic range, lower pixel response variation, and is photon nose limited, all of which enhances its use as a detector for a spectrometer. See also Digital Array Scanned Interferometers for Astronomy, W. H. Smith, et al., Experimental Astronomy 1: 389–405, 1991. In these devices, the interferometer introduces lateral shear in one direction and a two dimensional camera is aligned so a row of pixels is parallel to this geometric plane. In the perpendicular direction, a set of cylindrical lenses is used to provide an imaging capability along the columns of pixels. A row plot from the detector is an interferogram similar to the interferogram collected in a temporally modulated Michelson interferometer.

In a paper published in 1985, T. Okamoto et al. describe a method for optically improving the resolving power of the photodiode array of a Fourier transform spectrometer by modulating the spatial frequency of the interferogram with a dispersing element. With the use of a dispersing element, particularly an optical element with parallel surfaces, the distance between the two virtual sources varies with the wave number (the inverse of wavelength) of the source. Thus, as illustrated in FIG. 2 of this reference, by placing their optical dispersive element into the optical path of a common path interferometer, the distance between the virtual source becomes a function of the wave number (i.e., the optical dispersive element refracts the blue beam more than the red beam, yielding a wide distance between S1blue and S2blue and a narrower distance between S1red and S2red). The authors claim that use of the optical parallel greatly enhances the resolution. In principle, the spectrometer can be designed to examine any wavelength band of interest by careful choice of the type of dispersive glass utilized and the thickness of the glass. See "Optical Method for Resolution Enhancement in Photodiode Array Fourier Transform Spectroscopy," T. Okamoto et al, Applied Optics Vol. 24, No. 23, pp 4221–4225, 1 Dec. 1985.

The approach of Okamoto et al. has a number of drawbacks. First, because of the use of the dispersive block, the system no longer operates with constant wave number increments. This is in contrast with conventional Fourier transform spectrometers, which are constant wave number devices and are inherently spectrally calibrated. Thus, with Okamoto et al., blue wavelengths have a much smaller spectral resolution than red wavelengths, and the spectral calibration of the instrument becomes a major issue. Another drawback is that the spectral dispersion, while it enhances spectral resolution, adversely affects spatial resolution. Thus, the dispersive element would greatly increase the complexity of an imaging Okamoto et al. spectrometer. Another disadvantage of this technique is that its dependence on a dispersive material restricts its use to wavelengths that can be effectively transmitted through a dispersive element. Finally, the limited glass types that are available restrict the range of spectral enhancements available. While it is theoretically possible to use any dispersive glass and increase the size of the block to achieve the desired spectral enhancement, in practice the size of the block may become so large that the instrument is no longer practical. Also, since the enhancement depends on the glass type and size, the instrument designer has a limited number of parameters to use to optimize the spectrometer design and may not be able to arbitrarily set the lower and upper limits of the spectral region of interest.

In "Spatial Heterdoyne Spectroscopy: A Novel Interferometric Technique for the FUV," J. Harlander et al., SPIE Vol. 1344, pp. 120–131 (1990), the authors describe an improved interference spectrometer which has no moving parts, can be field widened, and can be built in an all reflection configuration for UV applications, particularly FUV applications. Harlander et al. are addressing a different problem from that addressed in Okamoto et al. and approach their solution in a different manner (e.g., the use of angular shear instead of the lateral shear required by Okamato et al.). The basic concept (illustrated in FIG. 1 of this reference) is based on a Michelson type interferometer in which the return mirrors are replaced by diffractive gratings. These gratings, which disperse the radiation, produce Fizeau fringes (i.e., interferograms) which are recorded by a detector positioned in the image plane. The Fourier transform of the fringe pattern recovers the spectrum. An all reflection version of the foregoing utilizes a collimator, a diffraction grating and two mirrors. Light from the collimator is split into two beams by the first half of the diffraction grating, which travel in different directions until they are recombined by the second half of the same grating and focused onto the detector by a mirror. This is illustrated in FIG. 2 of this reference. See also, "Spatial Hetrodyne Spectroscopy for the Exploration of Diffuse Interstellar Emission Lines at For-Ultraviolet Wavelengths," J. Harlander et al., The Astrophysical Journal, 396: 730–740, 1992 Sep. 10, and U.S. Pat. No. 5,059,027 to Roesler et al. All the designs suggested/disclosed require the use of collimated light and angular shear.

There are a number of drawbacks/limitations associated with the designs suggested/disclosed in the above referenced Harlander et al. publications and Roesler, et al. patent (collectively "Harlander et al."). First of all, Harlander et al. do not disclose the concept of imaging a spatially varying scene. Their invention is discussed in the context of imaging a star or some other type of point source. They implicitly assume that the light coming into their optical system is homogenous and report a single spectra. In many cases this may not be true, and proper measurement of the scene would require spectra for each spatial element in the scene. Secondly, all of the Harlander et al. designs require collimating the input beam. Such designs are inherently more complicated than designs which do not require collimated light. Third, the Michelson design on which their designs are based is inherently less mechanically stable than the common path design, since the interferometer is not self-compensating for motions in the elements of the interferometer. It is also not clear if the concept of Harlander et al. is applicable to instruments which utilize lateral shear, as opposed to angular shear. Fourth, although not explicitly stated, all the designs of Harlander et al. require a re-imaging lens to image the virtual sources at infinity. Finally, Harlander et al. require a complex method for separating wavelengths below the central wavelength from those above the central wavelength. That is, a detected fringe pattern could have two different interpretations, it could be from a source a below the central wavelength or $\Delta\lambda$ above. Harlander, et al., discusses methods for determining the true wavelength.

OBJECTS OF THE INVENTION

It is an object of the present invention to provide Fourier transform spectrometer which has all the advantages of the spectrometers disclosed in U.S. Pat. No. 6,687,007 B1, but which is: (a) easier to construct; (b) works in all wavelengths, including infrared and, particularly, long wave infrared (approximately 8–12 microns); and (c) has an increased optical throughput.

It is another object of the present invention to provide a Fourier transform spectrometer which both splits and spectrally disperses incoming wavelengths to produce two sets of spectrally dispersed beams in which the long wavelengths within the range of wavelengths of interest do not overlap.

It is yet another object of the present invention to provide a Fourier transform spectrometer which utilizes a matched pair of gratings to spectrally disperse the incoming beam of wavelengths, which pair of gratings are located outside that portion of the spectrometer's optical system, the interferometer optics portion, which splits the incoming beam into two paths.

It is still yet another object of the present invention to place the grating pair in front of the interferometer optics.

It is still yet another object of the present invention to place the grating pair between the interferometer optics and the detector of the Fourier transform spectrometer.

It is a further object of the present invention to provide for an improved beam splitter which effectively eliminates the light loss inherent in prior beam splitters utilized in common path interferometers.

It is still another object of the present invention to provide an improved beam splitter which can be used in a common path interferometer without the use of dispersive gratings.

The foregoing and other objects will be apparent from the drawings and the description set forth herein.

SUMMARY OF THE INVENTION

This invention relates to optical instruments having, inter alia, optics to process wavelengths of electromagnetic radiation to produce an interferogram. The instruments include at least one optical path and optical elements positioned along this path for splitting the wavelengths and spectrally dispersing them to produce first and second sets of spectrally dispersed beams which are subsequently interfered with each other to produce a plurality of different fringes of different wavelengths. The optics for dispersing the wavelengths may include at least one matched pair of gratings. The optics also includes a beam splitter, positioned along the optical path, for splitting the optical path, and first and second reflecting surfaces. The beam splitter and first and second reflecting surfaces constitute the interferometer optics. The gratings may be positioned along the optical path either in front of or after the interferometer optics.

Finally, the interferometer optics includes a novel beam splitter including an optically transmissive element having first and second surfaces. The first surface is divided into first, second and third zones. In each of these zones, the percentage of light that is either reflected or transmitted is described as substantially for the reason that no optics can be perfect. While there will be an extremely minimal amount of loss inherent to the optics, high quality parts can reduce this loss to, in some cases less than 0.1% of the total wavelengths incident. The first zone has a first coating which, for the wavelengths being split, is substantially 100% reflective. The second zone has a second coating which is allows for substantially 50% of the wavelengths to be reflected and 50% to be transmitted. The third zone is substantially 100% transmissive. The second zone is between the first and the third zone. The second surface may have an anti-reflective coating. The first and second surfaces are parallel. The novel beam splitter design can be used with or without the dispersive gratings of, for instance, the present invention.

The instruments further include an aperture positioned along the optical path to define one spatial dimension, a detector for detecting the interferogram positioned along the optical path, and optics for focusing the aperture on the detector to create a one dimension spectral image, and means for processing the detected interferogram to produce spectral information.

The invention also includes the method of spectrally dispersing the wavelengths to produce first and second sets of spectrally dispersed beams which interfere with each other to produce a plurality of different fringes of different wavelengths with the described instrumentation.

DESCRIPTION OF THE PREFERRED EMBODIMENTS

Figure 1:
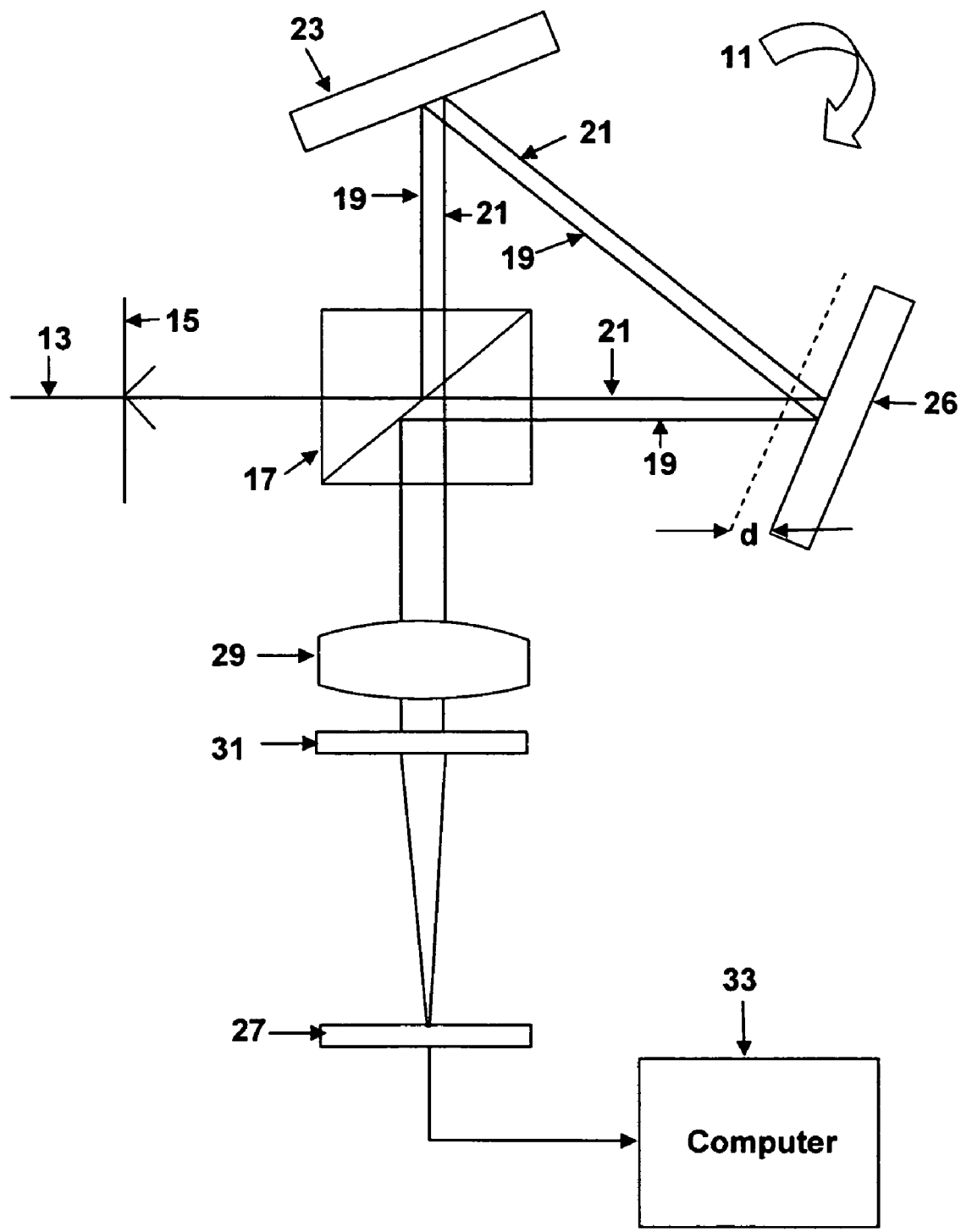
FIG. 1 is an optical schematic of a prior art spectrometer incorporating a common path or Sagnac interferometer.

With reference to FIG. 1, Fourier transform spectrometer 11 processes an incident light source 13 through an aperture 15, to a beam splitter 17, where source 13 is divided into a reflected beam (represented by central ray path 19) and a transmitted beam (represented by central ray path 21). The portion of source 13 represented by path 19 is reflected from the front surface a first mirror 23 to the front surface a second mirror 25, and then back to beam splitter 17. The second, transmitted portion of source 13 is reflected off second mirror 25, back to first mirror 23 and through beam splitter 17. Thus, beam splitter 17, together with mirrors 23 and 25, serve to split incident source 13 into two portions. Spectrometer 11 also includes a detector 27 which is placed at the back focal plane of spherical (Fourier) lens 29. (Aperture 15 is in the front focal plane.) A second, cylindrical lens 31 is interposed between detector 27 and spherical lens 29, which images spatial locations from 15 onto detector 27. As is well known in the art, spherical lens 29 and cylindrical lens 31 may be assembled from one of several optical elements in various sequences to minimize optical aberrations. As is well understood in the art, this basic arrangement produces an interfering light pattern or fringe pattern at the focus of spherical lens 29, commonly referred to as an interferogram. Cylindrical lens 31 images the relative physical distribution of source 13 as selected by aperture 15 such that as it impinges on detector 27 it represents the relative spacing for the various sources and their locations in source 13. The detector 27 is a charge-coupled device, or CCD. Alternatively, any photon counting array noise limited device, or other means of recording the optical signature, may be used. For an electric device, the output of detector 27 is processed by a computer 33 using Fourier transform techniques as is well known in the art to resolve the spectrum detected by detector 27.

Figure 2:
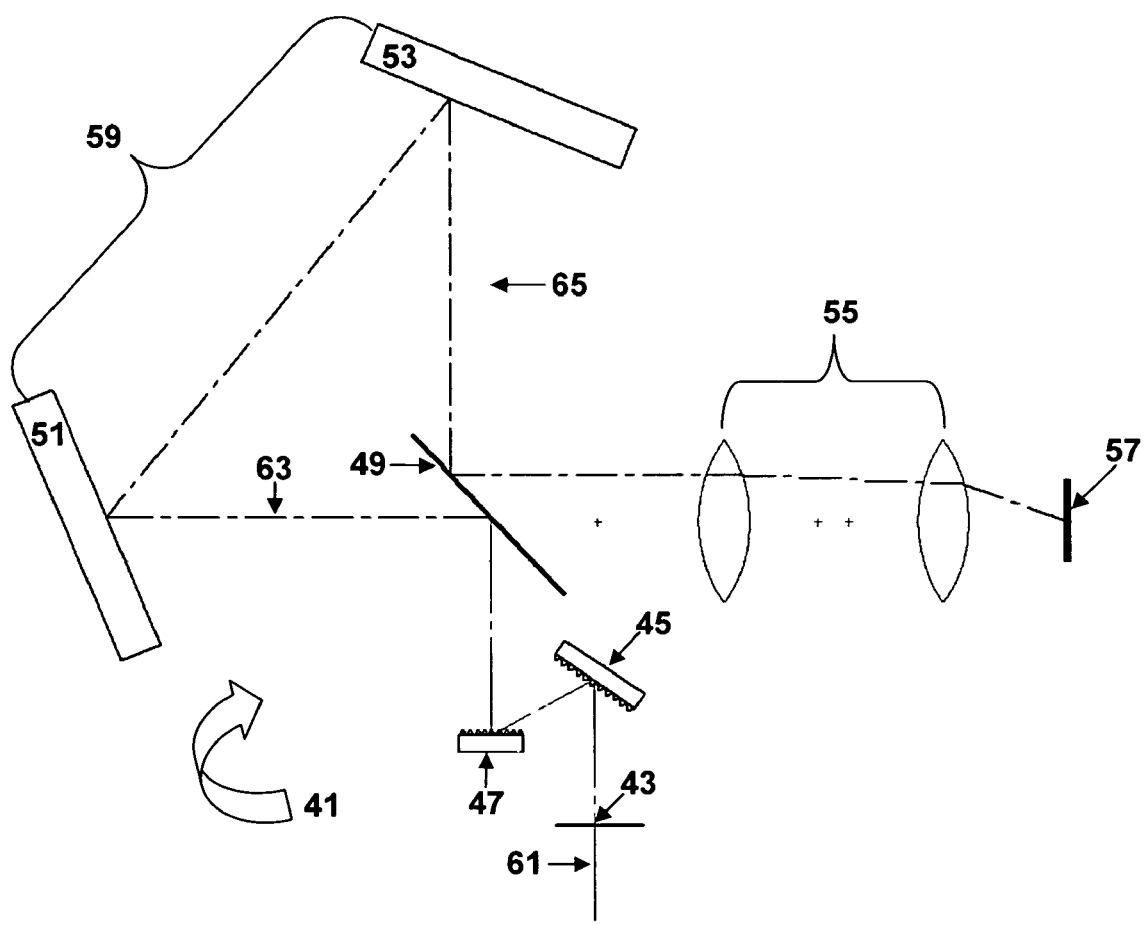
FIG. 2 is an optical schematic of the first embodiment of the present invention incorporated in a Sagnac interferometer in which the grating pair is placed in front of the interferometer.

To correct the problems inherent in the interferometer of Okamoto et al., and achieve the objectives set forth above, a pair of matched gratings is incorporated into the interferometer of the present invention. Thus, with reference to FIGS. 2 and 3, matched gratings have been integrated into the conventional interferometer design. FIG. 2, spectrometer 41, includes an aperture 43, first and second matched gratings 45 and 47, beam splitter 49, first mirror 51, second mirror 53, lens system 55 and detector 57. For grating pair 45, 47, the choice of grating pitch, grating order, etc., is determined in the manner set forth with regard to, for instance, the embodiments of FIGS. 2 and 3 of U.S. Pat. No. 6,687,007 B1. Beam splitter 49, is, in this embodiment, of conventional design. Mirrors 51 and 53 are typically first surface mirrors. Beam splitter 49, together with mirrors 51 and 53 is sometimes referred to as interferometer optics 59. Lens system 55 is of the conventional Fourier lens/cylindrical lens combination used to image spatial locations from aperture 43 onto detector 57, as discussed above with regard to FIG. 1. Further, as with the prior embodiment, the output of detector 57 is processed by a computer (not shown) using well known Fourier transform technique to resolve the spectrum detected.

In operation, incident light, represented by central ray path 61, passes through aperture 43 and onto first and second gratings 45 and 47 where it is dispersed to produce the desired amount of lateral wavelength dependant spectral spreading of the light. This is illustrated in FIG. 2 of U.S. Pat. No. 6,687,007 B1. As with, for instance, the embodiments of FIGS. 2 and 3 of U.S. Pat. No. 6,687,007 B1, in addition to producing the desired lateral wavelength dependant spectral spreading, the use of grating pair 45 and 47 allows for an easy adjustment of the amount of lateral spectral spread in the system, without introducing any optical aberrations, because the gratings diffract light only in a plane perpendicular to the grooves.

After being dispersed by gratings 45 and 47, the light is divided into a reflected beam, represented by central ray path 63 and a transmitted beam, represented by central ray path 65. As those skilled in the art appreciate, ray paths 63 and 65 are recombined by lens system 55 and focused onto detector 57. This invention has the advantage over the prior art of allowing spectral mapping to be conducted at selectable wavelengths, defined by the choice of grating specifications.

Figure 3:
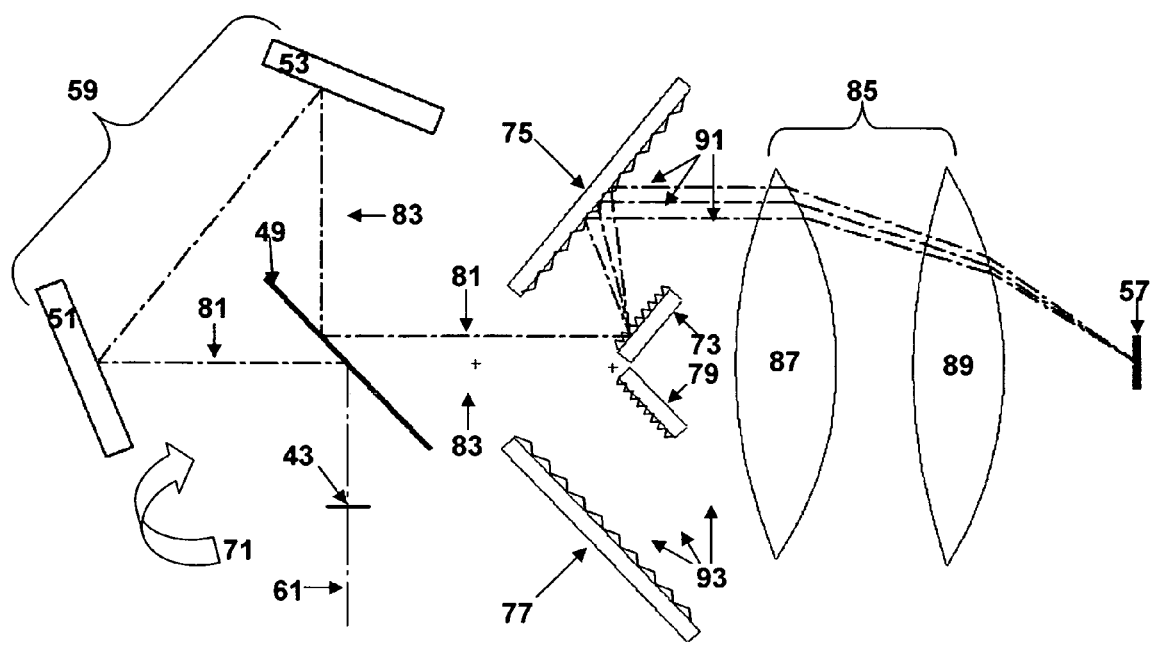
FIG. 3 is an optical schematic of the second embodiment of the present invention, in which the grating pair is positioned along the optical path of the interferometer after the interferometer optics.

FIG. 3, spectrometer 71 illustrates an alternate embodiment of the present invention in which the grating pair is positioned after the interferometer optics. Spectrometer 71 includes the aperture 43, beam splitter 49, first mirror 51 and second mirror 53 of interferometer optics 59, and detector 57, which are identical to those depicted in FIG. 2 and function to split incident radiation into two separate beams. FIG. 3 also depicts lens system 85 which is the functional equivalent of lens system 55 of FIG. 2. As is well known in the art, lens system 85 includes a spherical (Fourier) lens 87 and a cylindrical lens 89 and functions to recombine the split beam paths onto detector 57. As is well known in the art, spherical lens 87 and cylindrical lens 89 may be assembled from one of several optical elements in various sequences to minimize optical aberrations. FIG. 3 further depicts the incorporation of first pair of gratings 73 and 75, and second pair of gratings 77 and 79. For grating pairs 73, 75 and 77, 79, the choice of grating pitch, grating order etc. is determined in the manner set forth with regard to, for instance, the embodiments of FIGS. 2 and 3 of U.S. Pat. No. 6,687, 007 B1. The embodiment of FIG. 3 of the current application differs from the invention of the prior application in that the reflected beam and transmitted beam are dispersed by separate and distinct pair of gratings. This arrangement is necessary as the beam of light is dispersed subsequent to being split. This arrangement, as in the previous embodiment, has the benefit of allowing spectral mapping to be conducted over selectable wavelengths based on the grating parameters.

In operation, with reference to FIG. 3, incident light, represented by central ray path 61 is divided into a reflected beam, represented by central ray path 81, and a transmitted beam (represented by central ray path 83) by interferometer optics 59. Path 81 is directed onto a first pair of gratings 73 and 75. The gratings, as is well known in the art, function to spectrally disperse the incoming beam path to produce the required amount of lateral spread in the wavelengths. The dispersed beam is depicted in FIG. 3 as three beam paths collectively referred to as dispersed beam path 91. Beam path 91 is then focused by lens system 85 onto detector 57. Path 83 is spectrally dispersed in the same manner by a second pair of gratings 77 and 79 to produce dispersed beam path 93, which is depicted in FIG. 3 as three beam paths. Gratings 73 and 75 are symmetrically opposed and identical in all other respects to gratings 77 and 79. Dispersed paths 91 and 93, as those skilled in the art appreciate, are recombined by lens system 85 and focused onto detector 57.

The beam splitter 49 (and ultimately interferometer 59 which is commonly referred to as a Sagnac or common path interferometer) of FIGS. 1, 2 and 3 is of conventional design and is well known in the art. One inherent disadvantage of this conventional beam splitter design is that it ultimately loses 50% of the incident light during the beam splitting process as those skilled in the art will appreciate. This deficiency is evident from FIGS. 1, 2 and 3. In FIG. 3, for example, incoming beam path 61 is split into central ray paths 81 and 83, each representing 50% of the of the original light. Path 81 is reflected by mirrors 51 and 53 and directed back toward beam splitter 49. Beam splitter 49 functions in exactly the same manner as described above in that it reflects 50% of the incident radiation light and transmits 50%. The 50% that is transmitted is not available to be directed to the detector, representing a loss in optical throughput. Thus the remaining light represents only 25% of the total incident light. The total light of path 83 is similarly reduced with the difference that after being reflected by mirrors 51 and 53 onto beam splitter 49, the reflected portion of the incident light is lost from the system. Thus, the total throughput of the spectrometer is reduced by 50% relative to the light which is inputted into the system.

Figure 4:
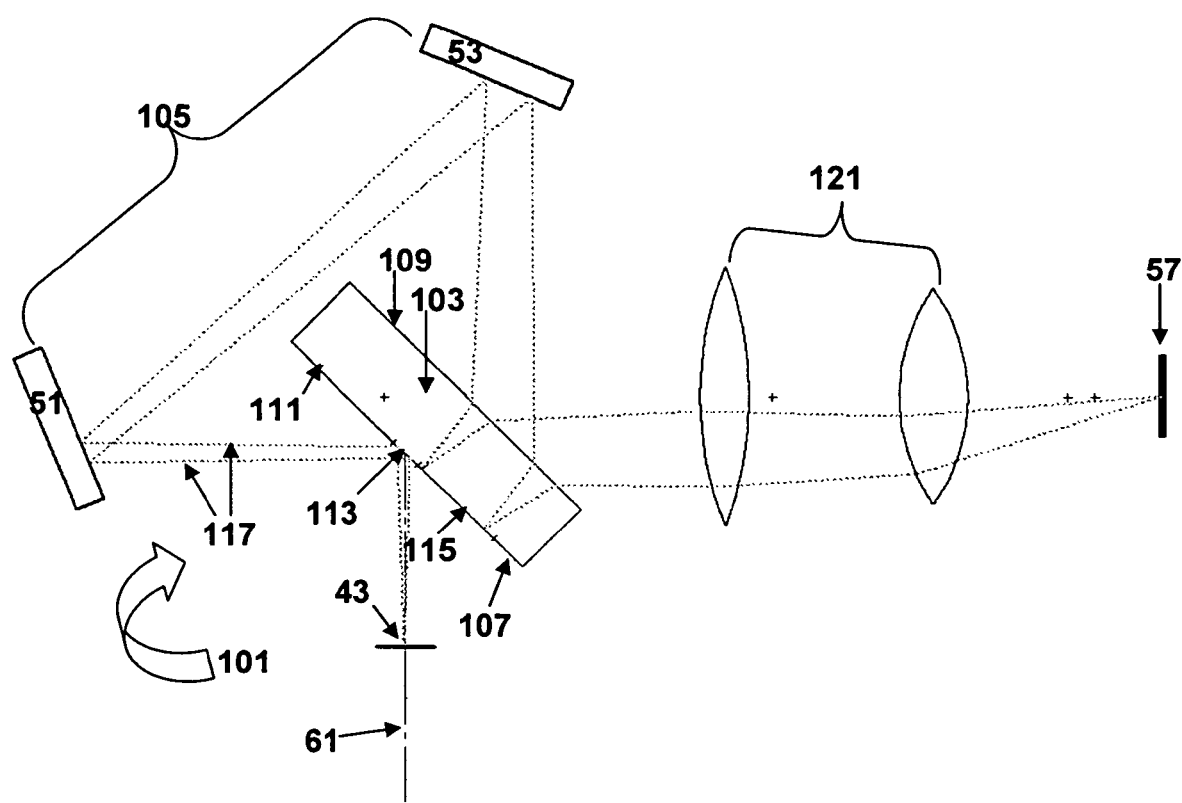
FIG. 4 is an additional partial optical schematic of the first embodiment of the present invention, particularly illustrating the novel beam splitter of the present invention and the reflected portion of the beam.
Figure 5:
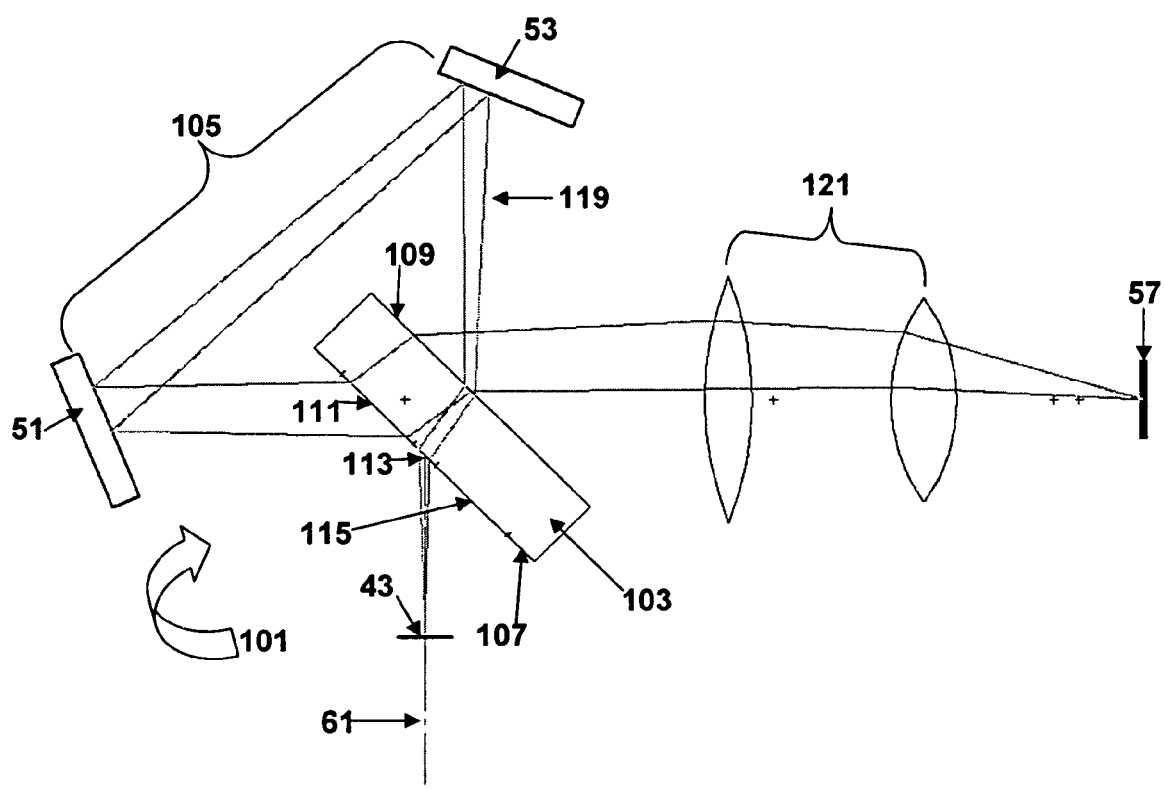
FIG. 5 is an additional partial optical schematic of the first embodiment of the present invention, particularly illustrating the novel beam splitter of the present invention and the transmitted portion of the beam.
Figure 6:
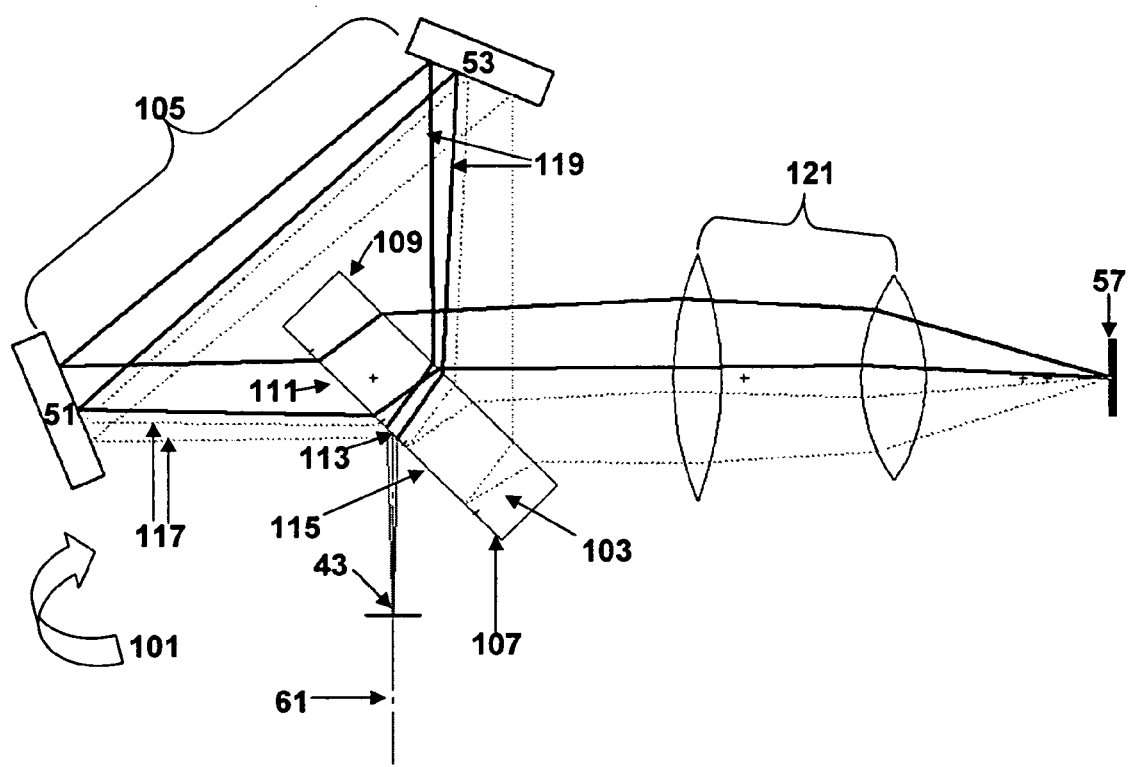
FIG. 6 is a partial optical schematic of the first embodiment of the present invention illustrating, inter alia, the convergence of the transmitted and reflected portions of the beam.

To solve this inherent problem of the Sagnac (or common path) interferometer, beam splitter 103 (as referenced on FIGS. 4, 5, and 6) is incorporated into the interferometer optics 105 of spectrometer 101, replacing beam splitter 49. FIG. 4 is a partial optical schematic that illustrates the use of beam splitter 103 to reflect a portion of the incident light. FIG. 5 is a partial optical schematic that illustrates the use of beam splitter 103 to transmit a portion of the incident light. FIG. 6 represents the combination of reflected light path of FIG. 4 and the transmitted light path of FIG. 5. Spectrometer 101 further includes lens system 121 which is functionally equivalent to lens system 55 of FIG. 2, comprised of a cylindrical lens and a Fourier lens combined to focus the radiation on detector 57.

Beam splitter 103 is constructed with an optically transmissive and reflective material. Beam splitter 103 includes first surface 107 and second surface 109. First surface 107 is divided into first zone 111, second zone 113, and third zone 115. In one embodiment all three zones of equal lengths along first surface 107. In other embodiments, first zone 111 and third zone 115 are of equal lengths along first surface 107 with second zone 113 occupying the balance of length on first surface 107. Third zone 115 (on surface 107) is coated to reflect substantially 100% of the incident light in a spectral bandwidth compatible with the desired operating optical bandwidth of the system. Second zone 113 is coated to partially reflect and partially transmit the incident light, normally 50% each. First zone 111 is coated with an anti-reflective (or transmissive) coating to transmit substantially 100% of the incident light.

In operation, with reference to FIGS. 4, 5 and 6, incident light, represented by ray path 61 is partially reflected and partially transmitted by the coating of zone 113 on surface 107 of beam splitter 103. FIG. 4 depicts the path of the reflected light as two paths as it is naturally dispersed, collectively referred to as path 117. FIG. 5 depicts the path of the transmitted light as two paths as it is naturally dispersed, collectively referred to as path 119. FIG. 4 further illustrates that reflected beam path 117 is reflected by mirrors 51 and 53 and is directed toward third zone 115 of beam splitter 103. Path 117 is incident upon second surface 109 of beam splitter 103 and is refracted toward the third zone 115 of first surface 107 where path 117 is reflected back through beam splitter 103 toward second surface 109. Beam 117 is refracted upon exiting beam splitter 103 toward lens system 121 where it is focused upon detector 57. The angles of refraction, as is well known in the art, can be calculated by standard methodology.

FIG. 5 further illustrates the transmitted beam path 119 of spectrometer 101. Transmitted beam path 119 is reflected by mirrors 51 and 53 and is directed toward first zone 111 of beam splitter 103 where it is further transmitted and refracted through first zone 111 of beam splitter 103 toward lens system 121.

FIG. 6 shows the combination of beam paths 117 and 119 of spectrometer 101. FIG. 6 further illustrates beam paths being recombined by lens system 121 and focused on detector 57.

Figure 7:
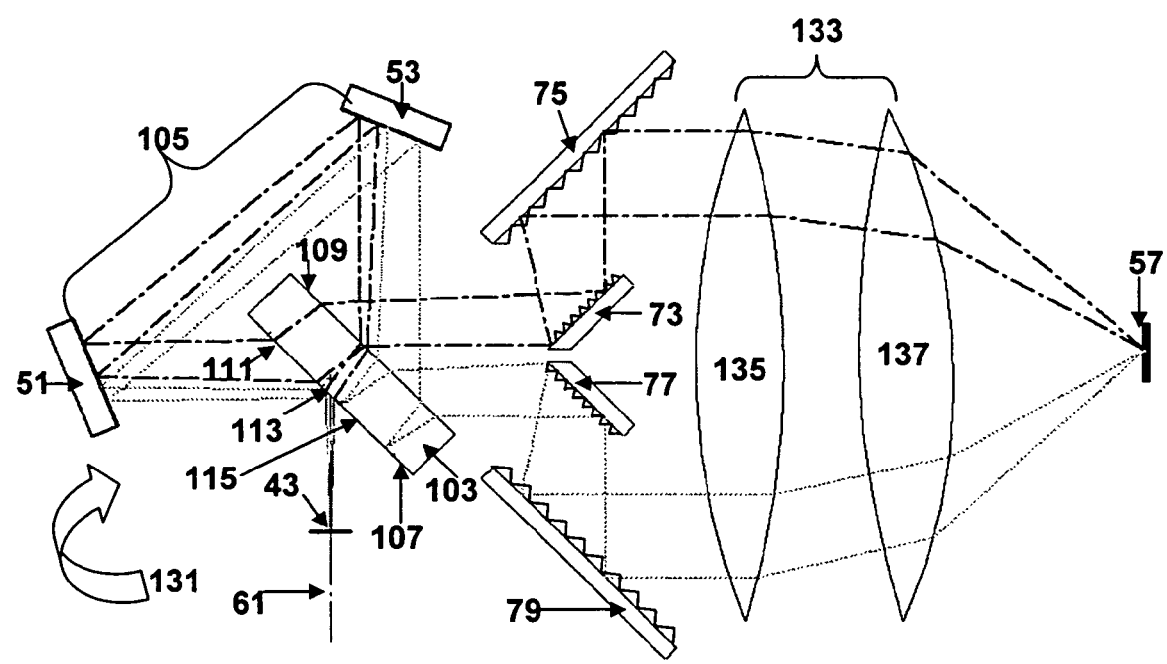
FIG. 7 is an optical schematic of the second embodiment of the present invention in which the prior art beam splitter is replaced by the beam splitter of the present invention.

In the spectrometer 131 of FIG. 7, beam splitter 103 is incorporated into the invention as depicted in FIG. 3. Beam splitter 103 takes the place of the conventionally designed beam splitter 49, and the disclosure of FIGS. 4, 5 and 6 is incorporated into the description of FIG. 7. The embodiment of the invention as depicted in FIG. 7 has multiple advantages over the prior art. First, it incorporates the benefits of gratings being placed after the beam splitter apparatus as described with reference to FIG. 3 above. Second, the new beam splitter increases the throughput of the interferometer by approximately 100% as compared to the conventional interferometer design. Grating pairs 73, 75 and 77 and 79 function in the same manner as is disclosed with reference to FIG. 3 above. The choice of grating pitch, grating order, etc., is determined in the manner set forth with regard to, for instance, the embodiments of FIGS. 2 and 3 of U.S. Pat. No. 6,687,007 B1, and will not be affected by the index of refraction of the substrate material of beam splitter 103. FIG. 7 also depicts lens system 133 which is the functional equivalent of lens system 85 of FIG. 3. As is well known in the art, lens system 133 includes a spherical (Fourier) lens 135 and a cylindrical lens 137 and functions to recombine the split beam paths onto detector 57.

Whereas the drawings and accompanying description have shown and described the preferred embodiment, it should be apparent to those skilled in the art that various changes may be made in the form of the invention without affecting the scope thereof.

What is claimed is:

1. In an optical instrument for producing a spectral and spatial image from wavelengths of electromagnetic radiation to produce an interferogram, said instrument comprising: an optical path, an aperture positioned along said optical path to define one spatial dimension means positioned along said optical path for splitting said wavelengths into reflected and transmitted portions of said optical path and subsequently recombining said reflected and transmitted portions, means positioned along said optical path before said means for splitting and recombining for spectrally dispersing said wavelengths, said means for spectrally dispersing said wavelengths including a pair of gratings, said means for splitting and recombining said reflected and transmitted portions producing a combined beam containing lateral shear, a detector positioned along said optical path, and means positioned along said optical path to create an interferogram for each spatial location from said aperture onto said detector.

2. The instrument of claim 1, wherein said gratings are reflective.

3. The instrument of claim 1, wherein said gratings are positioned along said optical path in optical series with each other.

4. The instrument of claim 1, wherein said means for splitting and recombining includes a beam splitter positioned along said optical path for splitting said optical path into first and second optical path portions.

5. The instrument of claim 4, wherein said beam splitter includes an optically transmissive element having a first surface, said first surface being divided into first, second and third zones, said first zone having an anti-reflective coating which, for said wavelengths, is substantially 100% transmissive, said second zone having a second coating which, for said wavelengths, is partially transmissive and partially reflective, said third zone having a third coating which, for said wavelengths, is substantially 100% reflective, said second zone being between said first and said third zone.

6. The instrument of claim 5, wherein said second coating on said first surface of said optically transmissive element of said beam splitter is, for said wavelengths, approximately, 50% reflective and 50% transmissive.

7. The instrument of claim 5, wherein said means for splitting and recombining also includes first and second reflective means for recombining
said first and second reflective means being positioned relative to each other and said first, second and third zones of said first surface of said optically transmissive element of said beam splitter such that,
  i) said portion of said wavelengths reflected off said second zone is the reflected off said first reflective means, then reflected off said second reflective means, and then reflected off said third zone, and
  ii) said portion of said wavelengths transmitted through said second zone is then reflected off said second reflective surface, then reflected off said first reflective surface, and then through said first zone.

8. The instrument of claim 7, wherein said first and second reflective means are, respectively, first and second reflective surfaces.

9. An optical instrument for producing a spectral and spatial image from wavelengths of electromagnetic radiation to produce an interferogram, said instrument comprising: an optical path, an aperture positioned along said optical path to define one spatial dimension, means positioned along said optical path for splitting said wavelengths into reflected and transmitted portions of said optical path and subsequently recombining said reflected and transmitted portions, said means for splitting and recombining said reflected and transmitted portions producing a combined beam containing lateral shear, means positioned along said optical path after said means for splitting and recombining for spectrally dispersing said wavelengths, said means for spectrally dispersing said wavelengths including at least one pair of gratings a detector positioned along said optical path, and means positioned along said optical path to create an interferogram for each spatial location from said aperture onto said detector.

10. The instrument of claim 9, wherein said at least one pair of gratings are reflective.

11. The instrument of claim 9, wherein said at least one pair of gratings are positioned along said optical path in optical series with each other.

12. The instrument of claim 9, wherein said means for splitting and recombining includes a beam splitter including an optically transmissive element having a first surface, said first surface being divided into first, second and third zones, said first zone having an anti-reflective coating which, for said wavelengths, is substantially 100% transmissive, said second zone having a second coating which, for said wavelengths, is partially transmissive and partially reflective, said third zone having a third coating which, for said wavelengths, is substantially 100% reflective, said second zone being between said first and said third zone.

13. This instrument of claim 12, wherein said second coating on said first surface of said optically transmissive element of said beam splitter is, for said wavelengths, approximately, 50% reflective and 50% transmissive.

14. The instrument of claim 9, further including a second pair of gratings positioned along said optical path after said means for splitting and recombining said wavelengths, said at least one pair of gratings positioned in said reflected portion of said optical path said second pair of gratings positioned in said transmitted portion of said optical path.

15. The instrument of claim 14, wherein said at least one pair of gratings is in series with each other and said second pair of gratings is also in series with each other.

* * * * *